US010542018B1

(12) United States Patent
Anderson et al.

(10) Patent No.: US 10,542,018 B1
(45) Date of Patent: Jan. 21, 2020

(54) SECURITY BREACH NOTIFICATION

(71) Applicant: Wells Fargo Bank, N.A., San Francisco, CA (US)

(72) Inventors: Jared Stanley Anderson, Minneapolis, MN (US); Carolee Ann-Eckert Peterson, Brooklyn Park, MN (US); Jane Hollis, Coon Rapids, MN (US); Jennifer Lynn Struzyk, Columbia Heights, MN (US); Mary Louise Hurd, Coon Rapids, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 284 days.

(21) Appl. No.: 15/391,668

(22) Filed: Dec. 27, 2016

(51) Int. Cl.
  *H04L 29/06* (2006.01)
  *G06Q 20/38* (2012.01)
  *H04W 12/12* (2009.01)

(52) U.S. Cl.
  CPC ....... *H04L 63/1416* (2013.01); *G06Q 20/382* (2013.01); *H04L 63/083* (2013.01); *H04W 12/12* (2013.01)

(58) Field of Classification Search
  CPC ..... H04L 63/10; H04L 63/107; H04L 63/083; H04L 63/1416; H04L 63/1425; H04W 12/12; G06Q 20/382
  USPC .................................................. 725/22–23
  See application file for complete search history.

(56) References Cited

U.S. PATENT DOCUMENTS

| | | | | |
|---|---|---|---|---|
| 7,039,953 B2 * | 5/2006 | Black | ...................... | G06F 21/55 709/203 |
| 7,272,855 B1 * | 9/2007 | Yemeni | .............. | G06Q 20/3821 705/76 |
| 7,293,289 B1 * | 11/2007 | Loc | ..................... | H04L 63/1416 726/22 |
| 7,461,404 B2 * | 12/2008 | Dudfield | ............. | H04L 63/1408 726/22 |
| 7,877,805 B1 * | 1/2011 | Loc | ....................... | H04W 12/12 380/270 |

(Continued)

FOREIGN PATENT DOCUMENTS

KR   20050093286 A   9/2005

OTHER PUBLICATIONS

Holmquist, Lars Erik, et al., "Smart—Its Friends: A Technique for Users to Easily Establish Connections between Smart Artefacts", Ubicomp 2001, LNCS 2201, pp. 116-122, (2001), 6 pgs.

*Primary Examiner* — Hosuk Song

(74) *Attorney, Agent, or Firm* — Schwegman Lundberg & Woessner, P.A.

(57) ABSTRACT

Systems and methods are disclosed for security breach notification. In one implementation, an indication of a security breach is received, at a first device with respect to a user account. Based on the indication of the security breach, a processing device generates a security breach notification, the security breach notification including an instruction to initiate at an account repository one or more actions with respect to the user account. An attempt is made to transmit the security breach notification to the account repository via a first communication interface of the first device. In response to a determination that the security breach notification was not successfully transmitted to the account repository, the security breach notification is transmitted to a second device via a second communication interface of the first device.

18 Claims, 5 Drawing Sheets

(56) References Cited

U.S. PATENT DOCUMENTS

| | | | |
|---|---|---|---|
| 7,934,103 B2 * | 4/2011 | Kidron | H04L 63/145 |
| | | | 713/164 |
| 8,180,704 B2 | 5/2012 | Mcquaide, Jr. et al. | |
| 8,219,490 B2 | 7/2012 | Hammad et al. | |
| 9,055,090 B2 * | 6/2015 | Delatorre | H04L 63/1441 |
| 9,596,251 B2 * | 3/2017 | Lietz | H04L 63/1408 |
| 2002/0133462 A1 | 9/2002 | Shteyn | |
| 2006/0175397 A1 | 8/2006 | Tewari | |
| 2008/0103778 A1 | 5/2008 | Kim et al. | |
| 2008/0228602 A1 | 9/2008 | Bauman et al. | |
| 2012/0322380 A1 | 12/2012 | Nannarone et al. | |
| 2013/0042204 A1 | 2/2013 | Derks | |
| 2014/0058854 A1 | 2/2014 | Ranganath et al. | |
| 2014/0244461 A1 | 8/2014 | Shenoy et al. | |

* cited by examiner

US 10,542,018 B1

SECURITY BREACH NOTIFICATION

TECHNICAL FIELD

Aspects and implementations of the present disclosure relate to data processing, and more specifically, to security breach notification.

BACKGROUND

Unique user accounts can be generated and issued to respective users. Such user accounts can enable the user to initiate or authorize various operations. Accordingly, it can be important to maintain the security of the user account in order to prevent its unauthorized use.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to security breach notification.

It can be appreciated that a unique user account (such as can be generated/issued by an institution) can enable a user to initiate or authorize various operations, transaction, etc. However, in scenarios in which the security of the user account (and/or information pertaining thereto) is breached (e.g., if it is lost or stolen), the potential for unauthorized use of the account is significant. Additionally, the risk of such unauthorized use increases rapidly as more time passes after the breach. Moreover, even having discovered that the security of a user account may have been breached, various technical limitations (e.g., a lack of reliable network access) can limit the ability of a user associated with the account to promptly notify the account issuer of the security breach.

Accordingly, described herein in various implementations are technologies, including methods, machine readable mediums, and systems, that enable security breach notifications to be generated. Such notifications can then be transmitted to an account repository where the compromised account (e.g., a credit card) can be, for example, disabled. Additionally, in scenarios in which technical limitations prevent the notification from being transmitted directly to the repository, the notification can be relayed via one or more additional devices until it reaches the account repository. In doing so, the time from the discovery of the security breach (e.g., loss of the card) until the disabling of the account can be reduced/minimized, thereby preventing as much unauthorized activity as possible.

Accordingly, it can be appreciated that the described technologies are directed to and address specific technical challenges and longstanding deficiencies in multiple technical areas, including but not limited to security, account management, and communication technologies. As described in detail herein, the disclosed technologies provide specific, technical solutions to the referenced technical challenges and unmet needs in the referenced technical fields and provide numerous advantages and improvements upon conventional approaches. Additionally, in various implementations one or more of the hardware elements, components, etc., (e.g., sensors, devices, etc.) referenced herein operate to enable, improve, and/or enhance the described technologies, such as in a manner described herein.

Figure 1:
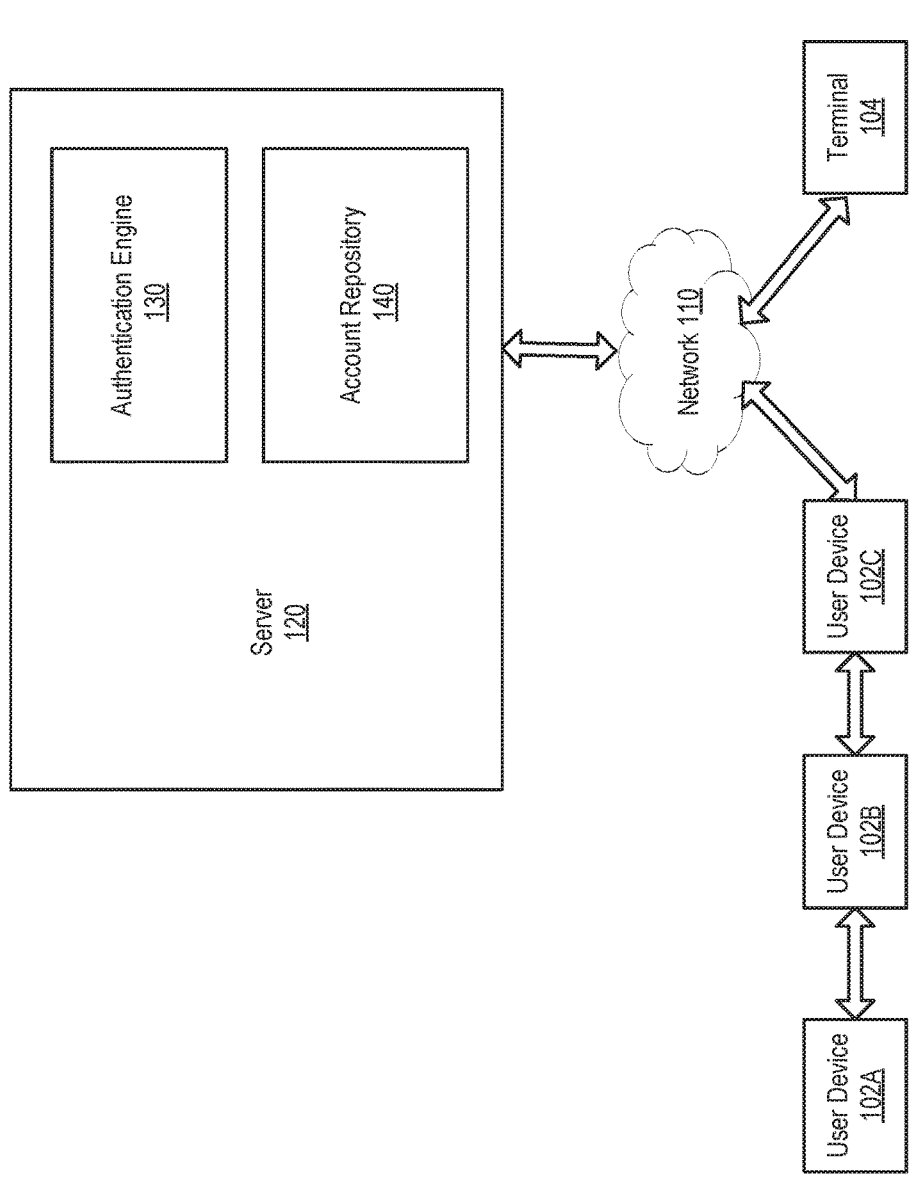
FIG. 1 depicts an illustrative system architecture, in accordance with one implementation of the present disclosure.

FIG. 1 depicts an illustrative system architecture 100, in accordance with one implementation of the present disclosure. The system architecture 100 includes one or more user devices 102A-C, terminal 104, and server 120. These various elements or components can be connected to one another via network 110, which can be a public network (e.g., the Internet), a private network (e.g., a local area network (LAN) or wide area network (WAN)), or a combination thereof. Additionally, in certain implementations various elements can communicate and/or otherwise interface with one another (e.g., user device 102A with user device 102B).

Each user device 102 can be a rackmount server, a router computer, a personal computer, a portable digital assistant, a mobile phone, a laptop computer, a tablet computer, a camera, a video camera, a netbook, a desktop computer, a media center, a smartphone, a watch, a smartwatch, a wearable device, an in-vehicle computer/system, any combination of the above, or any other such computing device capable of implementing the various features described herein. Various applications, such as mobile applications ('apps'), web browsers, etc. can run on the user device (e.g., on the operating system of the user device). It should be understood that, in certain implementations, user device 102 can also include and/or incorporate various sensors and/or communications interfaces (including but not limited to those depicted in FIGS. 2 and 5 and/or described/referenced herein). Examples of such sensors include but are not limited to: accelerometer, gyroscope, compass, GPS, haptic sensors (e.g., touchscreen, buttons, etc.), microphone, camera, etc. Examples of such communication interfaces include but are not limited to cellular (e.g., 3G, 4G, etc.) interface(s), Bluetooth interface, WiFi interface, USB interface, NFC interface, etc.

Figure 2:
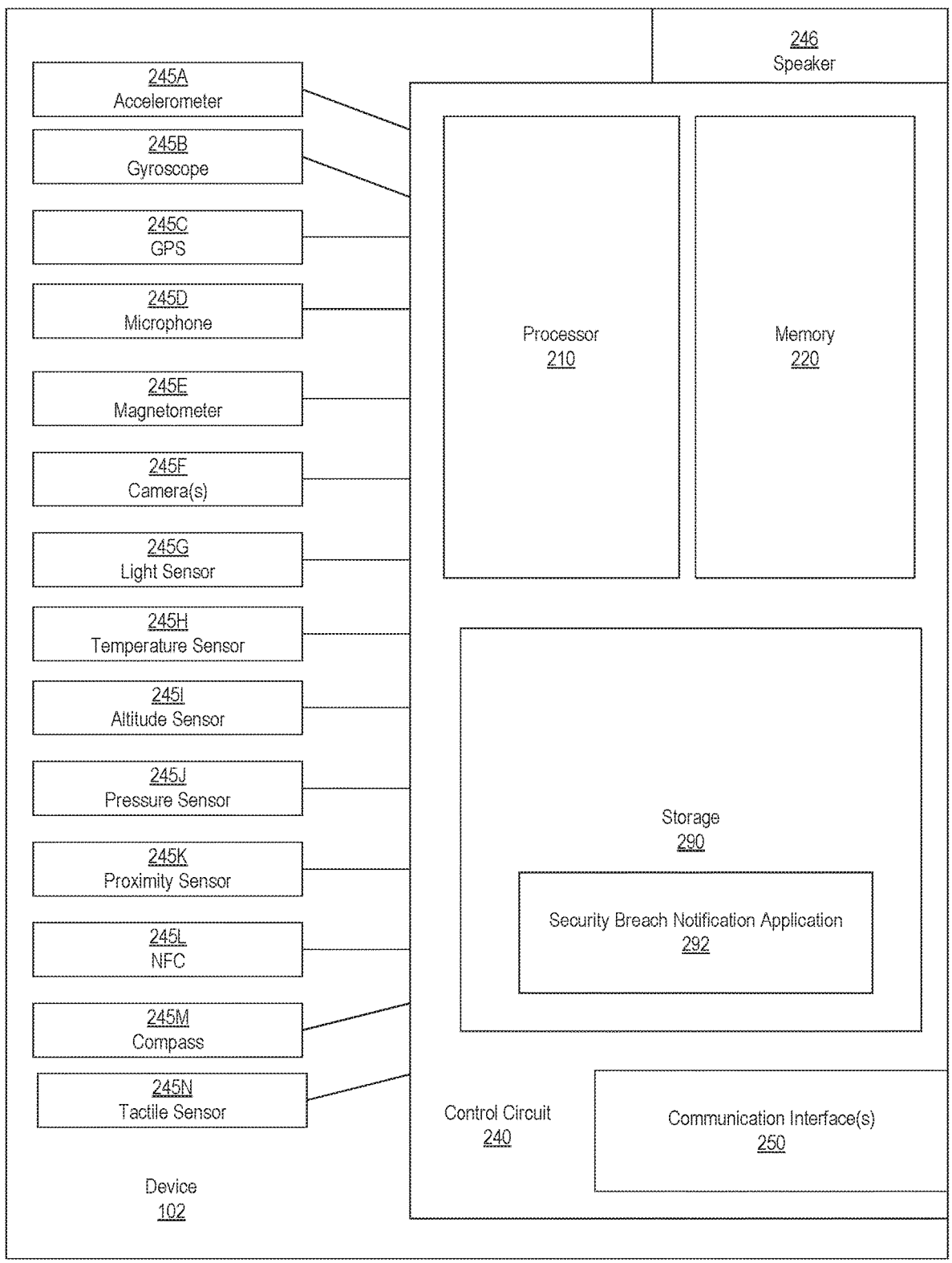
FIG. 2 depicts an exemplary implementation of a device in accordance with aspects and implementations of the present disclosure.

As noted, in certain implementations, user device(s) 102 can also include and/or incorporate various sensors and/or communications interfaces. By way of illustration, FIG. 2 depicts one exemplary implementation of user device 102. As shown in FIG. 2, device 102 can include a control circuit 240 (e.g., a motherboard) which is operatively connected to various hardware and/or software components that serve to enable various operations, such as those described herein. Control circuit 240 can be operatively connected to processor 210 and memory 220. Processor 210 serves to execute instructions for software that can be loaded into memory 220. Processor 210 can be a number of processors, a multi-processor core, or some other type of processor, depending on the particular implementation. Further, processor 210 can be implemented using a number of heterogeneous processor systems in which a main processor is present with secondary processors on a single chip. As another illustrative example, processor 210 can be a symmetric multi-processor system containing multiple processors of the same type.

Memory 220 and/or storage 290 can be accessible by processor 210, thereby enabling processor 210 to receive and execute instructions stored on memory 220 and/or on storage 290. Memory 220 can be, for example, a random access memory (RAM) or any other suitable volatile or non-volatile computer readable storage medium. In addition, memory 220 can be fixed or removable. Storage 290 can take various forms, depending on the particular implementation. For example, storage 290 can contain one or more components or devices. For example, storage 290 can be a hard drive, a flash memory, a rewritable optical disk, a rewritable magnetic tape, or some combination of the above.

As shown in FIG. 2, storage 290 can store security breach notification application 292. In certain implementations, security breach notification application 292 can be, for example, instructions, an 'app,' etc., that can be loaded into memory 220 and/or executed by processing device 210, in order to enable a user of the device to interact with and/or otherwise utilize the security breach notification technologies described herein.

One or more communication interface(s) 250 are also operatively connected to control circuit 240. The various communication interface(s) 250 can include interfaces that enable communication between user device 102 and one or more external devices, machines, services, systems, and/or elements (including but not limited to those depicted in FIG. 1 and described herein). Communication interface(s) 250 can include (but is not limited to) a modem, a Network Interface Card (NIC), an integrated network interface, a radio frequency transmitter/receiver (e.g., WiFi, Bluetooth, cellular, NFC), a satellite communication transmitter/receiver, an infrared port, a USB connection, or any other such interfaces for connecting device 102 to other computing devices, systems, services, and/or communication networks such as the Internet. Such connections can include a wired connection or a wireless connection (e.g. 802.11) though it should be understood that communication interface 250 can be practically any interface that enables communication to/from the control circuit 240 and/or the various components described herein.

At various points during the operation of described technologies, device 102 can communicate with one or more other devices, systems, services, servers, etc., such as those depicted in FIG. 1 and/or described herein. Such devices, systems, services, servers, etc., can transmit and/or receive data to/from the user device 102, thereby enhancing the operation of the described technologies, such as is described in detail herein. It should be understood that the referenced devices, systems, services, servers, etc., can be in direct communication with user device 102, indirect communication with user device 102, constant/ongoing communication with user device 102, periodic communication with user device 102, and/or can be communicatively coordinated with user device 102, as described herein.

Also connected to and/or in communication with control circuit 240 of user device 102 are one or more sensors 245A-245N (collectively, sensors 245). Sensors 245 can be various components, devices, and/or receivers that can be incorporated/integrated within and/or in communication with user device 102. Sensors 245 can be configured to detect one or more stimuli, phenomena, or any other such inputs, described herein. Examples of such sensors 245 include, but are not limited to, an accelerometer 245A, a gyroscope 245B, a GPS receiver 245C, a microphone 245D, a magnetometer 245E, a camera 245F, a light sensor 245G, a temperature sensor 245H, an altitude sensor 245I, a pressure sensor 245J, a proximity sensor 245K, a near-field communication (NFC) device 245L, a compass 245M, and a tactile sensor 245N. As described herein, device 102 can perceive/receive various inputs from sensors 245 and such inputs can be used to initiate, enable, and/or enhance various operations and/or aspects thereof, such as is described herein.

At this juncture it should be noted that while the foregoing description (e.g., with respect to sensors 245) has been directed to user device(s) 102, various other devices, systems, servers, services, etc. (such as are depicted in FIG. 1 and/or described herein) can similarly incorporate the components, elements, and/or capabilities described with respect to user device 102. For example, terminal 104 can also incorporate one or more of the referenced components, elements, and/or capabilities. It should also be understood that certain aspects and implementations of various devices, systems, servers, services, etc., such as those depicted in FIG. 1 and/or described herein, are also described in greater detail below in relation to FIG. 5.

Terminal 104 can be a device such as an automated teller machine (ATM), a point of sale (POS) system, device, and/or terminal, a rackmount server, a router computer, a personal computer, a portable digital assistant, a mobile phone, a laptop computer, a tablet computer, a camera, a video camera, a netbook, a desktop computer, a media center, a smartphone, a watch, a smartwatch, an in-vehicle computer/system, any combination of the above, or any other such computing device capable of implementing the various features described herein. Various applications, such as mobile applications ('apps'), web browsers, etc. (not shown) can run on the terminal (e.g., on the operating system of the terminal). It should be understood that, in certain implementations, terminal 104 can also include and/or incorporate various sensors and/or communications interfaces (including but not limited to those depicted in FIG. 2 and described in relation to user device 102). Examples of such sensors include but are not limited to: accelerometer, gyroscope, compass, GPS, haptic sensors (e.g., touchscreen, buttons, etc.), microphone, camera, barcode scanner, etc. Examples of such communication interfaces include but are not limited to cellular (e.g., 3G, 4G, etc.) interface(s), Bluetooth interface, WiFi interface, USB interface, NFC interface, etc.

Server 120 can be a rackmount server, a router computer, a personal computer, a portable digital assistant, a mobile phone, a laptop computer, a tablet computer, a camera, a video camera, a netbook, a desktop computer, a smartphone, a media center, a smartwatch, an in-vehicle computer/system, any combination of the above, or any other such computing device capable of implementing the various features described herein. Server 120 can include components such as authentication engine 130, and account repository 140. It should be understood that, in certain implementations, server 120 can also include and/or incorporate various sensors and/or communications interfaces (including but not limited to those depicted in FIG. 2 and described in relation to user device 102). The components can be combined together or separated in further components, according to a particular implementation. It should be noted that in some implementations, various components of server 120 can run on separate machines (for example, account repository 140 can be a separate device). Moreover, some operations of certain of the components are described in more detail below.

Account repository 140 can be hosted by one or more storage devices, such as main memory, magnetic or optical storage based disks, tapes or hard drives, NAS, SAN, and so forth. In some implementations, repository 140 can be a network-attached file server, while in other implementations repository 140 can be some other type of persistent storage such as an object-oriented database, a relational database, and so forth, that can be hosted by the server 120 or one or more different machines coupled to the server 120 via the network 110, while in yet other implementations repository 140 can be a database that is hosted by another entity and made accessible to server 120. Repository 140 can store information relating to various user accounts (e.g., credit cards), such as account numbers, balances, usage history, and/or any other such related information/parameters.

It should be understood that though FIG. 1 depicts server 120 and devices 102, and terminal 104 as being discrete components, in various implementations any number of such components (and/or elements/functions thereof) can be combined, such as within a single component/system. For example, in certain implementations devices 102 and/or 104 can incorporate features of server 120.

As described in detail herein, various technologies are disclosed that enable security breach notification. In certain implementations, such technologies can encompass operations performed by and/or in conjunction with device(s) 102, terminal 104, and/or server 120.

Figure 3:
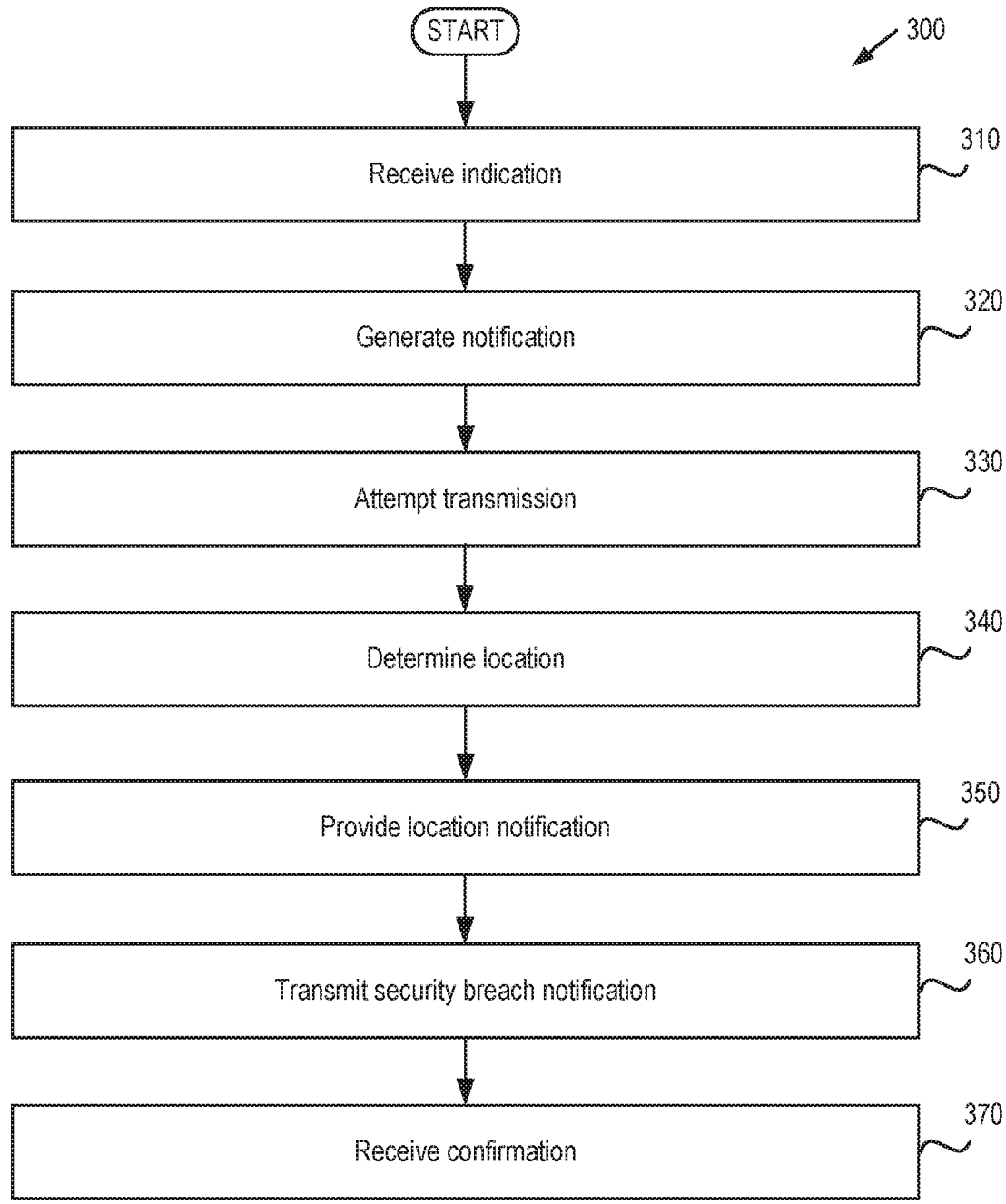
FIG. 3 depicts a flow diagram of aspects of a method for security breach notification in accordance with one implementation of the present disclosure.

FIG. 3 depicts a flow diagram of aspects of a method 300 for a security breach notification. The method is performed by processing logic that can comprise hardware (circuitry, dedicated logic, etc.), software (such as is run on a computing device such as those described herein), or a combination of both. In one implementation, the method is performed by one or more elements depicted and/or described in relation to FIG. 1 (including but not limited to user device(s) 102, authentication engine 130, and/or server 120) and/or FIG. 2 (e.g., security breach notification application 292 and/or device 102), while in some other implementations, one or more blocks of FIG. 3 can be performed by another machine or machines.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 310, an indication of a security breach can be received, e.g., at a first device (e.g., device 102A, as shown in FIG. 1). In certain implementations, such an indication of a security breach can be received with respect to a user account (e.g., a credit card number and/or any other such account). For example, in a scenario in which a user discovers that his/her credit card has been lost or stolen, the user can provide various inputs which can be received by device 102A, e.g., via an app (such as application 292 executing on the device 102A). Such inputs can include the credit card number itself, and/or various other identifier(s). Such identifiers can include, for example, identifying information (e.g., a phone number, email address, mailing address, social security number or a portion thereof, date of birth, password, PIN code, biometric information, transaction information such as date and/or amount of most recent transaction, etc.) such as can be used to identify and/or retrieve the user account (e.g., the credit card) whose security was breached/compromised. It can be advantageous to utilize such identifiers (e.g., in lieu of receiving the full credit card number of the lost/stolen card) in scenarios in which the user may not recall the full credit card number and/or in scenarios in which other device(s) are utilized to relay information pertaining to the security breach (as described herein). Such identifier(s) can then be used by the bank or institution that issued the credit card to identify the actual credit card/account number. It should be understood that, in certain implementations, various aspects of block 310 can be performed by user device 102A (e.g., while executing application 292), while in other implementations such aspects can be performed by one or more other elements/components, such as those described herein.

At block 320, a security breach notification can be generated. In certain implementations, such a security breach notification can be generated based on the indication of the security breach (e.g., as received at 310). Such a security breach notification can be, for example, a notification, message, etc., that indicates or otherwise reflects that the referenced user account (e.g., credit card) has been lost, stolen, etc. Additionally, in certain implementations the referenced security breach notification can include an instruction to initiate various actions at an account repository (e.g., account repository 140, as shown in FIG. 1, which can be, for example, a database of credit card numbers, accounts, etc., and related information that is maintained by a bank, financial institution, etc.). Such actions can include, for example, applying various restrictions to the user account. By way of illustration, the referenced security breach notification can include an instruction to apply various transaction restrictions with respect to the credit card. For example, the instruction (when executed in relation to the account repository of the bank, financial institution, etc. can limit or prevent transactions, purchases, etc., from being completed for a defined period of time (e.g., the next 48 hours), can limit or prevent transactions, purchases, etc., that exceed a defined monetary threshold (e.g., $20), etc. It should be understood that, in certain implementations, various aspects of block 320 can be performed by user device 102A (e.g., while executing application 292), while in other implementations such aspects can be performed by one or more other elements/components, such as those described herein.

Additionally, in certain implementations, the referenced security breach notification can include a relay instruction. That is, it can be appreciated that, in certain scenarios, the device with respect to which the initial indication of a security breach was provided (e.g., device 102A, as shown in FIG. 1) may not have access to a network connection (e.g., in a location with no cellular service) and thus may not be capable of transmitting the security breach notification to the bank, institution, etc. Being that it can be advantageous to provide such notification to the bank, etc., as soon as possible (in order to prevent unauthorized use of the lost/stolen card), the referenced security breach notification can also include a relay instruction. Accordingly, in a scenario in which user device 102A is capable of communication with another device (e.g., device 102B, such as via NFC, Bluetooth, WiFi direct, etc., communication protocols), device 102A can transmit the notification to the device that is accessible, and such receiving device (e.g., device 102B) can attempt to transmit the notification to the directly to the bank/account repository (e.g., via a network connection).

However, upon determining that the security breach notification was not successfully transmitted (e.g., by device 102B) to the account repository (because, for example, device 102B also does not have access to a network connection), the referenced relay instruction can direct/cause receiving device 102B to transmit the security breach notification to a third device (e.g., device 102C). In this manner, the referenced notification can continue to be relayed from device to device until it reaches the bank/institution to which it is directed. In doing so, the described technologies can expedite the delivery of such a notification (even in scenarios in which the initial device(s) cannot connect directly to the bank), thereby minimizing the opportunity for unauthorized use of the lost/stolen credit card.

At block 330, an attempt can be made (e.g., by device 102A) to transmit the security breach notification (e.g., as generated at 320) to the account repository (e.g., the bank, institution, etc.). In certain implementations, such an attempt to transmit the notification can be made via a first communication interface (e.g., a Wifi Internet connection, a cellular network, etc.) of the first device (e.g., device 102A). It should be understood that, in certain implementations, various aspects of block 330 can be performed by user device 102A (e.g., while executing application 292), while in other implementations such aspects can be performed by one or more other elements/components, such as those described herein.

At block 340, in response to a determination that the security breach notification was not successfully transmitted to the account repository (e.g., based on the attempt made at 330), a geographic location of the device can be determined. Such a location can be determined based on inputs received from GPS receiver 245C and/or using one or more other location determination techniques. As described below, such location can be used to notify the user of various proximate devices, terminals, etc. that the user can travel to in order to provide the security breach notification to the bank, institution, etc. It should be understood that, in certain implementations, various aspects of block 340 can be performed by user device 102A (e.g., while executing application 292), while in other implementations such aspects can be performed by one or more other elements/components, such as those described herein.

At block 350, in response to a determination that the security breach notification was not successfully transmitted to the account repository, a location notification can be provided at the first device (e.g., device 102A). Such a location notification can include or otherwise reflect a geographic location of a proximate device, terminal (e.g., ATM), etc. capable of communication with the account repository that is within a defined geographic proximity to the first device. For example, such a notification (which can be provided/presented at device 102A) can convey to the user the location of the closest ATM, etc., through which the user can notify the bank/institution of the loss of the credit card. It should be noted that, in certain implementations, such locations can be preloaded (e.g., downloaded and stored on the device, provided periodically based on the location of the user, etc.) such that the information can be accessed even in scenarios in which the device does not have access to a reliable network connection. It should be understood that, in certain implementations, various aspects of block 350 can be performed by user device 102A (e.g., while executing application 292), while in other implementations such aspects can be performed by one or more other elements/components, such as those described herein.

At block 360, in response to a determination that the security breach notification was not successfully transmitted to the account repository (e.g., was not received successfully by the bank), the security breach notification can be transmitted to a second device (e.g., device 102B). in certain implementations, such notification can be transmitted from device 102A to device 102B via a second communication interface, which can be different than the first communication interface, of the first device (e.g., via Bluetooth or NFC, in lieu of Wifi or cellular data which were unsuccessful in transmitting the notification). It should be understood that, in certain implementations, various aspects of block 360 can be performed by user device 102A (e.g., while executing application 292), while in other implementations such aspects can be performed by one or more other elements/components, such as those described herein.

At block 370, confirmation can be received (e.g., at device 102A). In certain implementations, such a confirmation can reflect a that the security breach notification was successfully received at the account repository. It should be understood that such confirmation can be transmitted from the bank/institution (e.g., server 120) using a similar/comparable relay technique as described above, such that the referenced confirmation can also be received by device 102A, even in a scenario in which it still does not have network access. It should be understood that, in certain implementations, various aspects of block 370 can be performed by user device 102A (e.g., while executing application 292), while in other implementations such aspects can be performed by one or more other elements/components, such as those described herein.

Figure 4:
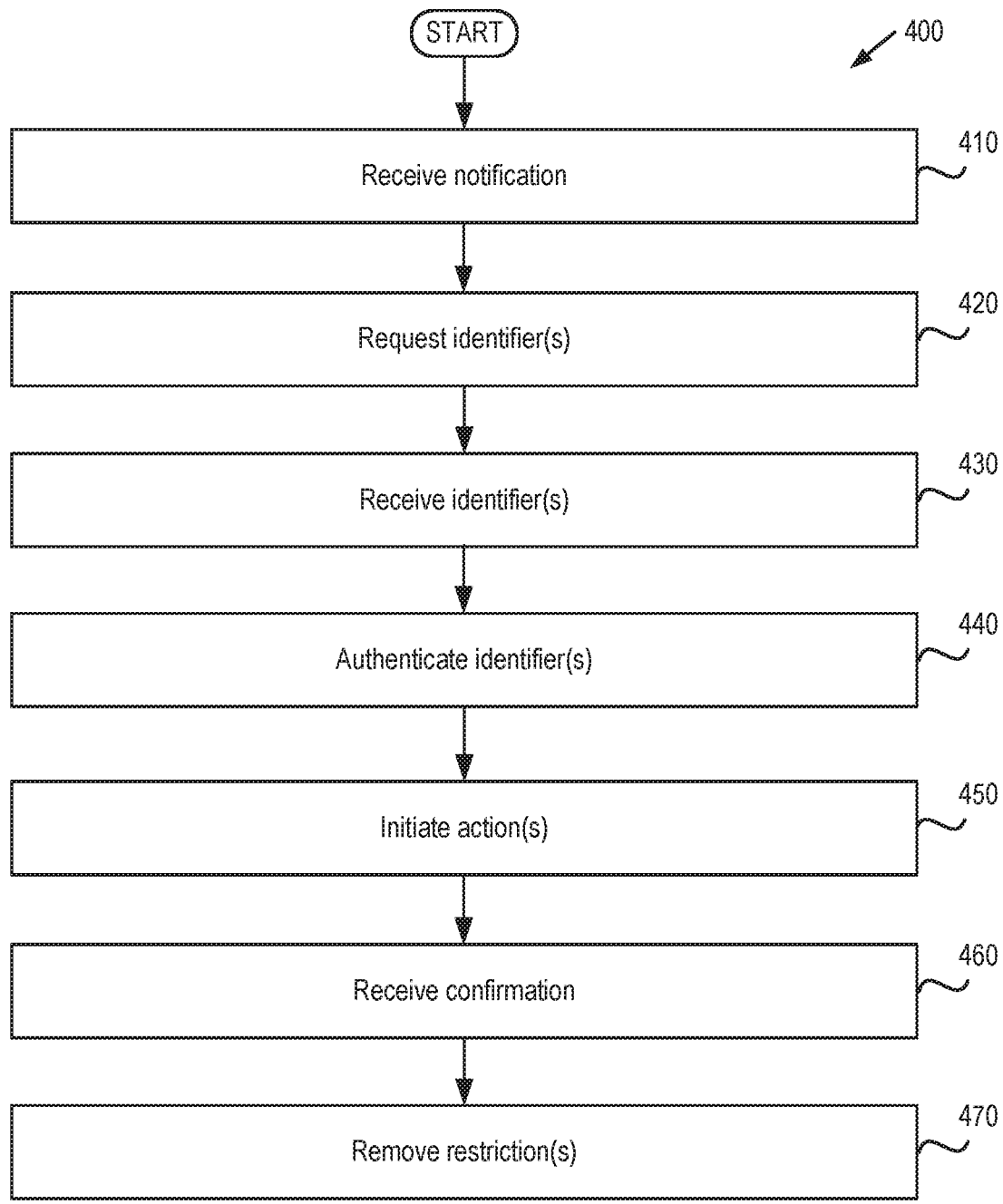
FIG. 4 depicts a flow diagram of aspects of a method for security breach notification in accordance with one implementation of the present disclosure.

FIG. 4 depicts a flow diagram of aspects of a method 400 for dynamic authentication identifier allocation. The method is performed by processing logic that can comprise hardware (circuitry, dedicated logic, etc.), software (such as is run on a computing device such as those described herein), or a combination of both. In one implementation, the method is performed by one or more elements depicted and/or described in relation to FIG. 1 (including but not limited to terminal 104, authentication engine 130, and/or server 120), while in some other implementations, one or more blocks of FIG. 4 can be performed by another machine or machines.

At block 410, a security breach notification can be received (e.g., at terminal 104, such as an ATM, POS system, etc.), such as with respect to a user account. Such a security breach notification can be, for example, an input, notification, message, etc., that indicates or otherwise reflects that the referenced user account (e.g., credit card) has been lost, stolen, etc. It should be understood that, in certain implementations, various aspects of block 410 can be performed by terminal 104, while in other implementations such aspects can be performed by server 120, authentication engine 130, account repository 140, and/or one or more other elements/components, such as those described herein.

At block 420, one or more identifiers can be requested. In certain implementations, such identifiers can be requested in response to receipt of the security breach notification (e.g., at 410). Such identifiers can include, for example, identifying information (e.g., a phone number, email address, mailing address, social security number or a portion thereof, date of birth, password, PIN code, biometric information, transaction information such as date and/or amount of most recent transaction, etc.) such as can be used to identify and/or retrieve the user account (e.g., the credit card) whose security was breached/compromised. For example, a user can approach an ATM and provide input(s) that indicate that their credit card was lost, stolen, etc. The ATM can then prompt the user to provide one or more of the referenced identifiers. By way of illustration, the ATM can request that the user enter their PIN, provide a biometric input to a fingerprint scanner, answer various security questions, etc. Such identifier(s) can then be used by the bank or institution to identify the actual credit card/account number. It should be understood that, in certain implementations, various aspects of block 420 can be performed by terminal 104, while in other implementations such aspects can be performed by server 120, authentication engine 130, account repository 140, and/or one or more other elements/components, such as those described herein.

At block 430, the one or more identifiers (e.g., those requested at 420) can be received. For example, as described above, the user can input a PIN to a keypad or touchscreen of the ATM, provide a fingerprint input to a fingerprint scanner, answer questions displayed on a display of the ATM, etc. It should be understood that, in certain implementations, various aspects of block 430 can be performed by terminal 104, while in other implementations such aspects can be performed by server 120, authentication engine 130, account repository 140, and/or one or more other elements/components, such as those described herein.

At block 440, the one or more identifiers can be authenticated with respect to the user account. For example, as described above, upon receiving the referenced identifiers (PIN code, social security number, fingerprint, etc.), such identifiers can be processed to determine which (if any) user accounts (e.g., credit card numbers) in the repository they correspond to. It should be understood that, in certain implementations, various aspects of block 440 can be performed by terminal 104, while in other implementations such aspects can be performed by server 120, authentication engine 130, account repository 140, and/or one or more other elements/components, such as those described herein.

At block 450, based on an authentication of the one or more identifiers with respect to the user account (e.g., at 440), one or more actions can be initiated with respect to the user account. Such actions can include, for example, applying various restrictions to the user account. By way of illustration, various transaction restrictions can be applied with respect to the credit card. For example, transactions, purchases, etc., can be limited or prevented from being completed for a defined period of time (e.g., the next 48 hours) and/or transactions, purchases, etc., that exceed a defined monetary threshold (e.g., $20), etc. can be limited/prevented.

Moreover, in certain implementations the referenced restriction can include a restriction that limits utilization of the user account to certain types of transactions. For example, in a scenario in which there is an increased likelihood that a credit card may no longer be in the possession of its owner (e.g., following a natural disaster), it can be advantageous to apply a restriction that limits utilization of the card to certain types of transactions/products (e.g., food, gas, etc.), and/or to transactions within a defined geographic area (e.g., within 20 miles of the residence of the user). In doing so, transactions that are likely to be unauthorized can be prevented, while those that are likely to be legitimate can be permitted.

Additionally, in certain implementations the referenced action(s) can include providing a transaction instruction (e.g., an instruction to the terminal/ATM to dispense a quantity of cash). That is, being that the user has lost their credit card and therefore can find themselves in a situation where they are no longer capable of paying for their immediate needs (food, drink, transportation, etc.), an amount of cash (e.g., $100) can be charged to the user account and provided (via the terminal/ATM) to the user. In doing so, the user can be enabled to pay for such items (e.g., food, transportation, etc.) despite the fact that they have no credit card. It should be understood that, in certain implementations, various aspects of block 450 can be performed by terminal 104, while in other implementations such aspects can be performed by server 120, authentication engine 130, account repository 140, and/or one or more other elements/components, such as those described herein.

At block 460, a confirmation can be received that the user account is secure. For example, subsequent to reporting the credit card as lost/stolen, the user can update/notify the bank, institution, etc., that the card has been found. It should be understood that, in certain implementations, various aspects of block 460 can be performed by terminal 104, while in other implementations such aspects can be performed by server 120, authentication engine 130, account repository 140, and/or one or more other elements/components, such as those described herein.

At block 470, the one or more restrictions can be removed, e.g., in response to receipt of the confirmation (e.g., at 460). For example, the purchase restrictions applied when the card was reported lost/stolen (e.g., preventing purchases above $20) can be removed when the user confirms that the card has been found. It should be understood that, in certain implementations, various aspects of block 470 can be performed by terminal 104, while in other implementations such aspects can be performed by server 120, authentication engine 130, account repository 140, and/or one or more other elements/components, such as those described herein.

It should also be noted that, in various implementations, upon receipt of the described security breach notification, those transactions executed in chronological proximity to the notification (e.g., shortly before or after) can be flagged as potentially fraudulent and/or canceled automatically (on account of the fact that there is an increased likelihood that the charges were not authorized, since they were initiated in close proximity to the time the security breach notification was generated, transmitted, and/or received).

It should also be noted that while the technologies described herein are illustrated primarily with respect to security breach notification, the described technologies can also be implemented in any number of additional or alternative settings or contexts and towards any number of additional objectives. It should be understood that further technical advantages, solutions, and/or improvements (beyond those described and/or referenced herein) can be enabled as a result of such implementations.

Figure 5:
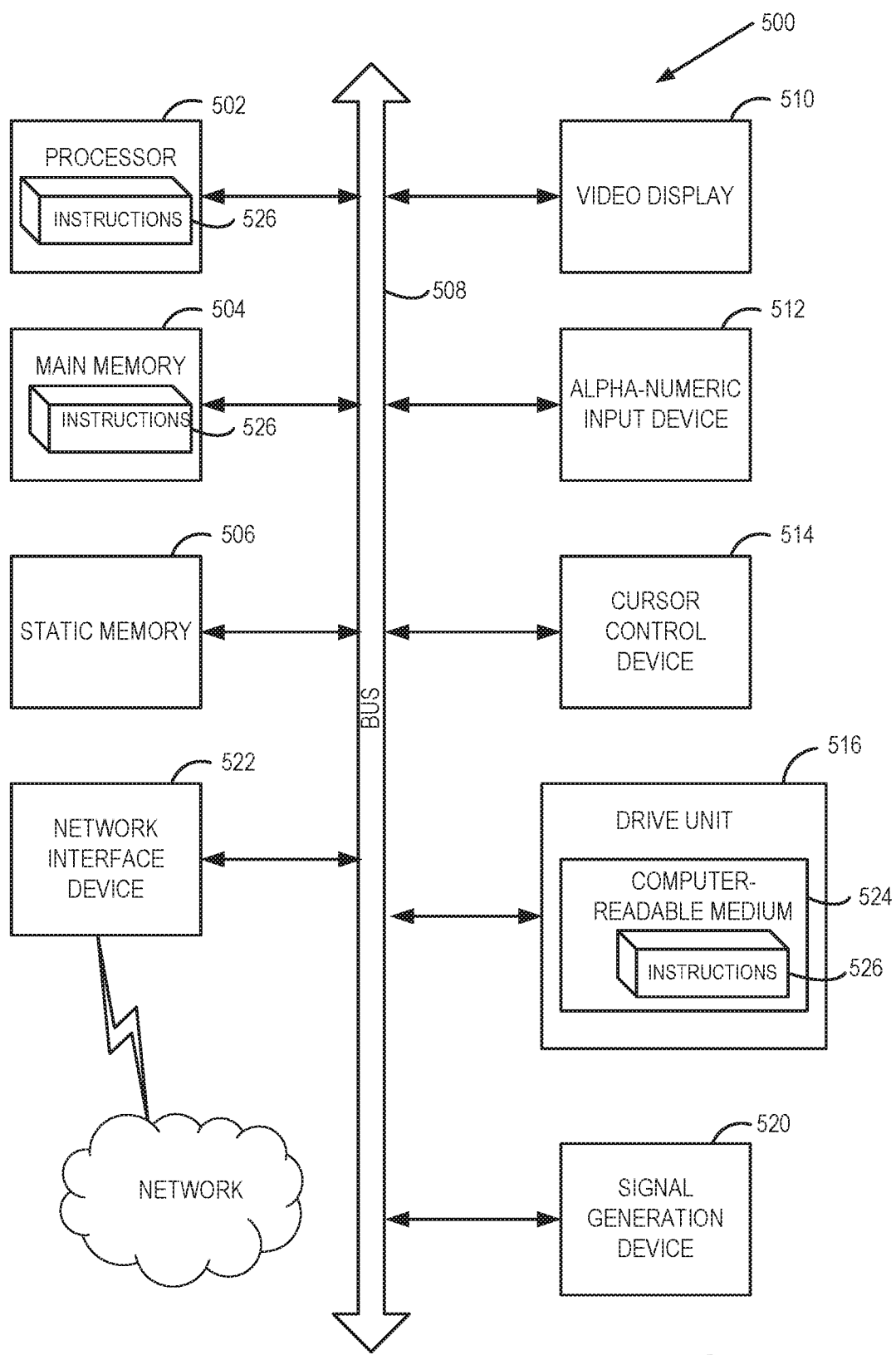
FIG. 5 depicts a block diagram of an illustrative computer system operating in accordance with aspects and implementations of the present disclosure.

FIG. 5 depicts an illustrative computer system within which a set of instructions, for causing the machine to perform any one or more of the methodologies discussed herein, can be executed. In alternative implementations, the machine can be connected (e.g., networked) to other machines in a LAN, an intranet, an extranet, or the Internet. The machine can operate in the capacity of a server in client-server network environment. The machine can be a computing device integrated within and/or in communication with a vehicle, a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing system (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processor 502 represents one or more processing devices such as a microprocessor, central processing unit, or the like. More particularly, the processor 502 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 can also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations discussed herein.

The computer system 500 can further include a network interface device 522. The computer system 500 can also include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 can include a computer-readable medium 524 on which is stored one or more sets of instructions 526 which can embody any one or more of the methodologies or functions described herein. Instructions 526 can also reside, completely or at least partially, within the main memory 504 and/or within the processor 502 during execution thereof by the computer system 500, the main memory 504 and the processor 502 also constituting computer-readable media. Instructions 526 can further be transmitted or received over a network via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments can be practiced without these specific details. In some instances, structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "processing," "providing," "identifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein which can also include a computer program stored and/or executed by the apparatus. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It should be understood that the present disclosure is not described with reference to any particular programming language. It will be appreciated that a variety of programming languages can be used to implement the teachings of the disclosure as described herein.

It is to be understood that the above description is intended to be illustrative, and not restrictive. Many other embodiments will be apparent to those of skill in the art upon reading and understanding the above description. Moreover, the techniques described above could be applied to practically any type of data. The scope of the disclosure should, therefore, be determined with reference to the appended claims, along with the full scope of equivalents to which such claims are entitled.

What is claimed is:

1. A method comprising:
   receiving, at a first device, an indication of a security breach with respect to a user account;
   generating, by a processing device of the first device and based on the indication of the security breach, a security breach notification including a relay instruction, the security breach notification comprising an instruction to initiate, at an account repository, one or more actions with respect to the user account;

attempting to transmit the security breach notification to the account repository via a first communication interface of the first device;

in response to a determination that the security breach notification was not successfully transmitted to the account repository, transmitting the security breach notification to a second device via a second communication interface of the first device; and wherein the relay instruction comprises an instruction that, when executed, causes the second device to:

attempt to transmit the security breach notification to the account repository, and in response to a determination that the security breach notification was not successfully transmitted to the account repository by the second device, transmit the security breach notification to a third device.

2. The method of claim 1, wherein receiving an indication of a security breach comprises receiving one or more identifiers.

3. The method of claim 1, wherein the security breach notification comprises an instruction to apply one or more restrictions to the user account.

4. The method of claim 3, wherein the one or more restrictions comprise a transaction restriction with respect to the user account.

5. The method of claim 1, further comprising:

in response to a determination that the security breach notification was not successfully transmitted to the account repository by the first device, determining a geographic location of the first device; and providing a location notification at the first device, the location notification comprising a geographic location of a device capable of communication with the account repository that is within a defined geographic proximity to the first device.

6. The method of claim 1, further comprising receiving a confirmation that the security breach notification was received at the account repository.

7. The non-transitory computer readable medium of claim 1, wherein the instructions, when executed by a processing device, further cause the processing device to perform operations comprising:

in response to a determination that the security breach notification was not successfully transmitted to the account repository by the first device, determining a geographic location of the first device; and providing a location notification at the first device, the location notification comprising a geographic location of a device capable of communication with the account repository that is within a defined geographic proximity to the first device.

8. The non-transitory computer readable medium of claim 1, wherein the instructions, when executed by a processing device, further cause the processing device to perform operations comprising:

receiving a confirmation that the security breach notification was received at the account repository.

9. A system comprising:

a processing device of a first device; and a memory coupled to the processing device and storing instructions that, when executed by the processing device, cause the system to perform operations comprising:

receiving, at the first device, an indication of a security breach with respect to a user account;

generating, based on the indication of the security breach, a security breach notification including a relay instruction, the security breach notification comprising an instruction to initiate at an account repository one or more actions with respect to the user account;

attempting to transmit the security breach notification to the account repository via a first communication interface of the first device;

in response to a determination that the security breach notification was not successfully transmitted to the account repository, transmitting the security breach notification to a second device via a second communication interface of the first device; and wherein the relay instruction comprises an instruction that, when executed, causes the second device to:

attempt to transmit the security breach notification to the account repository, and in response to a determination that the security breach notification was not successfully transmitted to the account repository by the second device, transmit the security breach notification to a third device.

10. The system of claim 9, wherein receiving an indication of a security breach comprises receiving one or more identifiers.

11. The system of claim 9, wherein the security breach notification comprises an instruction to apply one or more restrictions to the user account.

12. The system of claim 11, wherein the one or more restrictions comprise a transaction restriction with respect to the user account.

13. The system of claim 9, wherein the memory further stores instructions for causing the system to perform operations comprising:

in response to a determination that the security breach notification was not successfully transmitted to the account repository by the first device, determining a geographic location of the first device; and providing a location notification at the first device, the location notification comprising a geographic location of a device capable of communication with the account repository that is within a defined geographic proximity to the first device.

14. The system of claim 9, wherein the memory further stores instructions for causing the system to perform operations comprising receiving a confirmation that the security breach notification was received at the account repository.

15. A non-transitory computer readable medium having instructions stored thereon that, when executed by a processing device, cause the processing device to perform operations comprising:

receiving, at a first device, an indication of a security breach with respect to a user account;

generating, by a processing device of the first device and based on the indication of the security breach, a security breach notification including a relay instruction, the security breach notification comprising an instruction to initiate, at an account repository, one or more actions with respect to the user account;

attempting to transmit the security breach notification to the account repository via a first communication interface of the first device;

in response to a determination that the security breach notification was not successfully transmitted to the account repository, transmitting the security breach notification to a second device via a second communication interface of the first device; and wherein the relay instruction comprises an instruction that, when executed, causes the second device to:

attempt to transmit the security breach notification to the account repository, and in response to a determination that the security breach notification was not successfully transmitted to the account repository by the second device, transmit the security breach notification to a third device.

16. The non-transitory computer readable medium of claim 15, wherein receiving an indication of a security breach comprises receiving one or more identifiers.

17. The non-transitory computer readable medium of claim 15, wherein the security breach notification comprises an instruction to apply one or more restrictions to the user account.

18. The non-transitory computer readable medium of claim 17, wherein the one or more restrictions comprise a transaction restriction with respect to the user account.

* * * * *